United States Patent [19]

Staar

[11] 3,936,011

[45] Feb. 3, 1976

[54] TAPE CASSETTE TRANSPORT

[75] Inventor: Theophiel Clement Jozef Lodewijk Staar, Kraainem, Belgium

[73] Assignee: Staar, S.A., Brussels, Belgium

[22] Filed: Mar. 13, 1974

[21] Appl. No.: 450,721

[30] Foreign Application Priority Data
Mar. 16, 1973 Belgium .............................. 796866

[52] U.S. Cl. ............................................... 242/198
[51] Int. Cl.² ...................... G03B 1/04; G11B 15/32; G11B 23/04
[58] Field of Search ................. 242/198; 360/93, 96

[56] References Cited
UNITED STATES PATENTS 3,395,871  8/1968  Ackermann et al. ............... 242/198

*Primary Examiner*—Leonard D. Christian
*Attorney, Agent, or Firm*—Wolfe, Hubbard, Leydig, Voit & Osann, Ltd.

[57] ABSTRACT

Apparatus for transporting a tape cassette into engagement with the drive means of a recording and/or playback device. The transporting apparatus includes a movable housing which slidably receives a tape cassette and which is locked against attempts to engage the cassette with the tape drive mechanism unless the tape is properly oriented when inserted. The movable housing is capable of movement in two respectively transverse directions so as to first vertically align the cassette with the drive mechanism and thereafter to move the cassette into engagement with the drive mechanism.

11 Claims, 6 Drawing Figures

TAPE CASSETTE TRANSPORT

BACKGROUND OF THE INVENTION

1. Field of the Invention

The present invention relates to the recording of information on and the playback of prerecorded information from recording media in strip form and particularly to the insertion of magnetic tape cartridges or cassettes onto a tape deck. More specifically, this invention is directed to apparatus which facilitates the loading and unloading of cassettes or cartridges, the cassettes or cartridges containing a medium on which information has been or may be stored, onto record/playback apparatus. Accordingly, the general objects of the present invention are to provide novel and improved methods and apparatus of such character.

2. Description of the Prior Art

While not limited thereto in its utility, the present invention has been found to be particularly well suited for use with magnetic tape recording and/or playback apparatus of the type which receives cartridges or cassettes of magnetic tape; the cassettes being of the type wherein the tape is unwound from one spool or reel and is wound up on another spool or reel after having passed in front of a recording or playback head. Some of the problems associated with the loading or insertion of tape cartridges into such recording equipment are discussed in U.S. Pat. 3,385,534 which is assigned to the assignee of the present invention.

To briefly summarize the operation of a cassette type tape deck, in order to load the apparatus a cartridge or cassette must be caused to move relative to the tape deck in a substantially perpendicular direction in order to engage the cassette with upstanding elements on the deck such as the capstan, the shafts of the unwinding spool and the winding spool, positioning rods, etc. This tape insertion operation requires, from the user or operator, a degree of manipulative care.

The trend in the art is to reduce, to the extent possible, the attention and care the operator must give to the cassette loading operation. Thus, by way of example, in tape decks intended for installation in motor vehicles it is desired to simplify the loading operation to the point where driver distraction is minimized. Thus, in present apparatus, tape cassette insertion has been reduced to the step of merely inserting the cassette into a housing by sliding it into a slot arranged for this purpose on the front of the apparatus.

Continuing with a discussion of previously available tape recording-playback apparatus of the cassette type, the housing into which the cassette is to be introduced by sliding generally comprises two rails in which the lateral edges of the cassette slide. This equipment, nevertheless, is susceptible to jamming and thus requires more than the desired minimum amount of operator attention.

SUMMARY OF THE INVENTION

The present invention overcomes the above briefly discussed and other deficiencies and disadvantages of the prior art by providing a novel and improved transport device for a cartridge, for example a magnetic tape cassette, which permits the cartridge to be placed into the operative position with minimum attention and effort on the part of the operator. Thus, in accordance with the present invention means are provided for facilitating the loading or insertion of self-contained tape cartridges or cassettes, such cartridges or cassettes being of the type having openings in at least one surface for receiving tape reel drive means, onto a tape deck or equivalent apparatus. The present apparatus comprises a movable housing into which a cartridge may be slidably introduced. The present invention further includes guide means adapted to initially direct said movable housing in a first direction and, subsequently, in a direction substantially perpendicular to the first direction so that the openings in the surface of the cartridge will be vertically aligned with and thereafter engaged with the means for effecting control and driving of the tape.

In accordance with a preferred embodiment, the guide means for directing the movement of the movable cassette receiving housing comprises projections adapted to engage grooves or slots provided in oppositely disposed parallel sides of a frame. These grooves serve to guide the movable housing, during insertion, initially substantially parallel to and subsequently substantially perpendicular to the plane of sliding of the cassette during the initial step of the loading operation.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
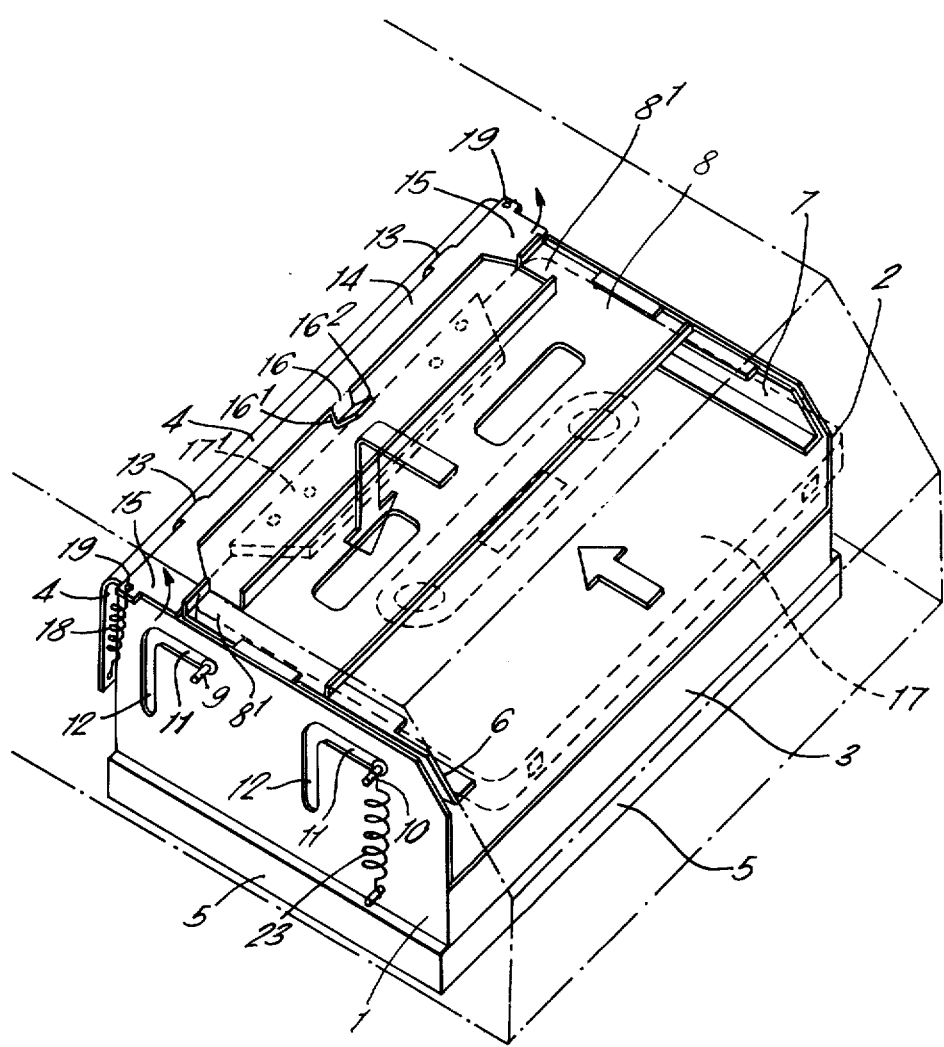
FIG. 1 is a partial perspective view of a preferred embodiment of a cassette transporting means in accordance with the present invention.

With reference now to the drawing, and particularly FIG. 1, apparatus in accordance with the present invention comprises a frame defined by a pair of oppositely disposed lateral sides 1 and 2. Sides 1 and 2 are interconnected at their front edges by a transverse bar member 3 and are interconnected at their opposite or rear edges by a transverse member 4. The frame is completed by a base member 5.

Disposed within the frame between the lateral sides 1 and 2, and movable with respect thereto, is a housing defined by a pair of oppositely disposed U-shaped channels 6 and 7 interconnected by a transversely extending plate 8. In the manner to be described in more detail below, the movable housing comprising channels 6 and 7 and plate 8 receives a self-contained tape cartridge or cassette 17; the cassette being shown in phantom in FIG. 1. The channel defining members 6 and 7 are each provided with a pair of projections, indicated at 9 and 10 for channel 6, which extend transversely to engage slots or grooves formed in the lateral sides 1 and 2 of the frame. Each of the grooves or slots is of generally L-shaped configuration and is defined by connecting portions 11 and 12. The portions 11 of the grooves in sides of the frame cooperate with the projections on the movable housing channel members to enable the housing to slide parallel to a plane defined by the frame base member 5; this first direction of movement being the direction of insertion of the tape cartridge 17. When the limit of movement in the first direction is reached, the groove portions 12 cause the movable frame to be displaced in a direction perpendicular to the initial direction of motion.

Figure 2:
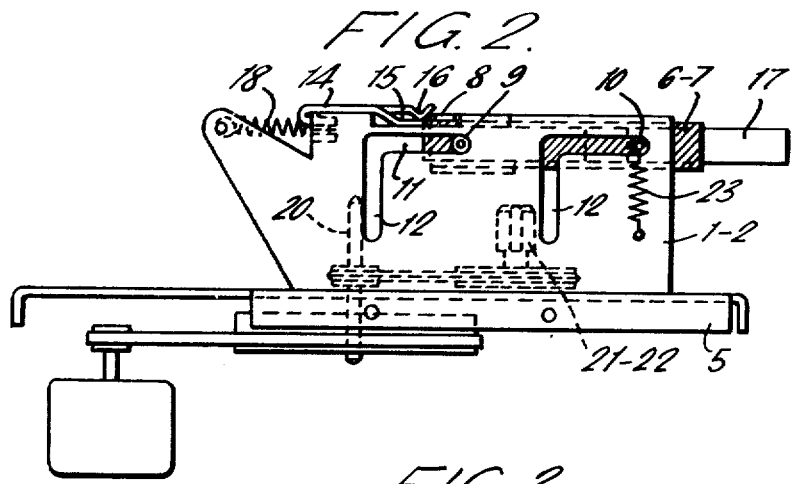
FIGS. 2, 3 and 4 are side views illustrating the operation of the embodiment of FIG. 1 respectively from the introduction of a tape cassette to the unlocking of the movable housing and finally to the operative position.

A blocking member 14, which is in the form of a tongue, is pivotally mounted by means of hinges 13 on the upper part of rearwardly disposed member 4 of the frame. Blocking member 14 extends the entire width of the space between the lateral side walls 1 and 2 and carries, at its oppositely disposed ends, forwardly extending projections or feet 15. As may be seen from FIG. 1, these projections 15 of blocking member 14 are adapted to engage projecting portions $8^1$ of the transverse plate 8 of the movable frame. The projections on the blocking member 14 thus function as a stop to maintain the movable frame in the non-operative position of FIGS. 1, 2 and 5 until a tape is fully inserted therein. The blocking member 14 is biased toward its lowered or blocking position, as depicted in FIGS. 1 and 2, by a pair of springs 18 which extend between the frame member 4 and lugs 19 on the pivotal member 14. It is to be noted that different approaches to the manner of mounting the springs 18 have been shown in FIG. 1 and in FIGS. 2–4. At its center the member 14 is provided with a forwardly extending projection 16 which is bent into respective downwardly and upwardly inclined portions $16^1$ and $16^2$ so as to define a camming surface for the purpose to be described below.

Figure 4:
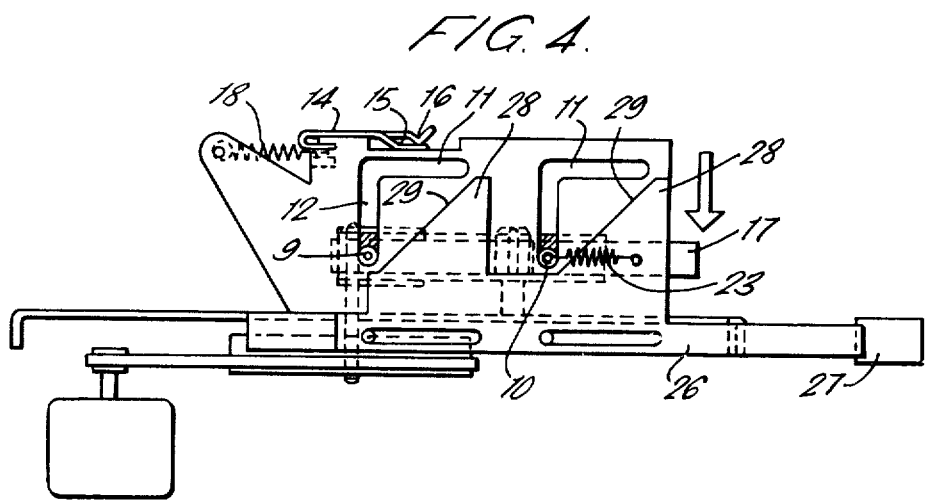
Figure 5:
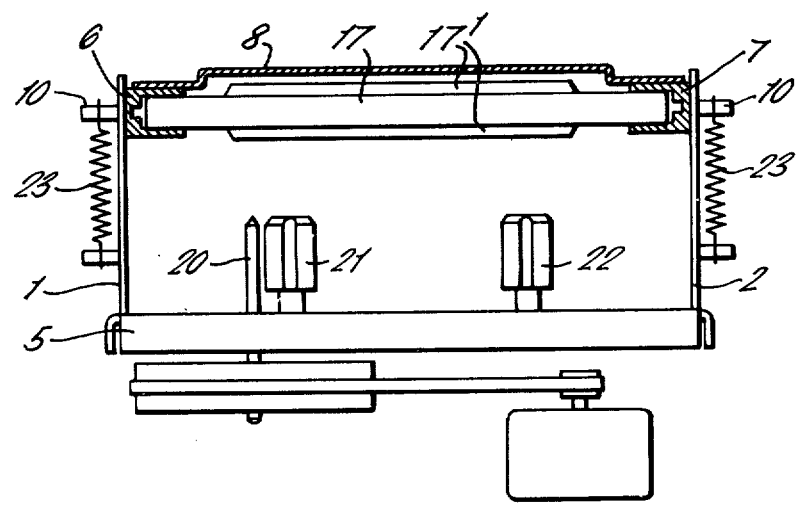
FIGS. 5 and 6 are front views of the embodiment of FIG. 1 showing respectively the introduction of and the operative position of a tape cartridge.
Figure 6:
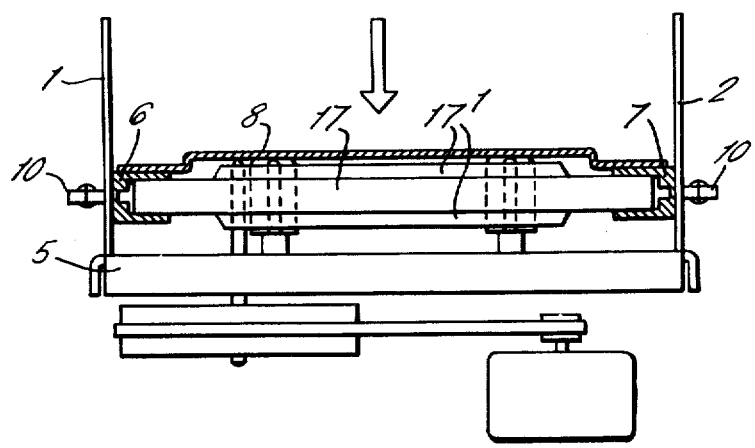

The disclosed embodiment of the present invention, as may best be seen from FIG. 4, also includes springs 23, an actuating rod 26 and its associated push-button 27 and cam plates 28 with inclined edges 29. The positioning and functioning of these additional elements will be described below in a discussion of the operation of the apparatus.

With the device in the unloaded position of FIGS. 1 and 2, a tape cartridge 17 will be introduced with its operative edge facing the projection 16 on blocking member 14. The tape cartridge will slide in the channels 6 and 7 until the thickened portion $17^1$ of its operative edge engages the portion $16^2$ of projection 16. Upon engagement with the projection 16, the tape cartridge will cause the member 14 to pivot upwardly thus releasing the movable housing for further movement. The blocking member 14 thus acts upon the movable housing to prevent displacement perpendicular to the direction of insertion of the tape cartridge prior to the full insertion of the tape cartridge. Thus, the tape cartridge 17 and the movable housing are first displaced parallel to the plane of insertion of the tape while being guided by the projections 9 and 10 in the portions 11 of the grooves in the sides 1 and 2 of the frame. Thereafter, when the tape cartridge has caused the blocking member 14 to be cammed upwardly, the movement in the first direction will be completed and the movable housing and tape cartridge will be guided in a second direction perpendicular to the first direction; i.e., the second motion will be in a plane transverse to the initial insertion plane. The second step of motion of the housing results from cooperation of the projections 9 and 10 on the housing with the portions 12 of the grooves in the frame lateral sides. The tape cartridge will thus be lowered onto and inserted into the driving and controlling elements; i.e., the capstan 20 and the shafts 21 and 22 of the spools or reels as shown in FIGS. 2–6.

The tape cartridge 17 and the movable housing are assisted in their descending movement by springs 23 which are anchored at first ends to the sides 1 and 2 and connected at their opposite ends to the projections 10.

It is to be noted that the projection 16 will be contacted by the thickened portion $17^1$ of the operative edge of the tape cartridge only if the cartridge is properly oriented when introduced into the movable housing. Thus, the tape cartridge itself cooperates with the blocking bar 14 to perform a security function which prevents the lowering of the tape cartridge onto the drive and control mechanisms 20, 21 and 22 when the cartridge is improperly inserted.

Figure 3:
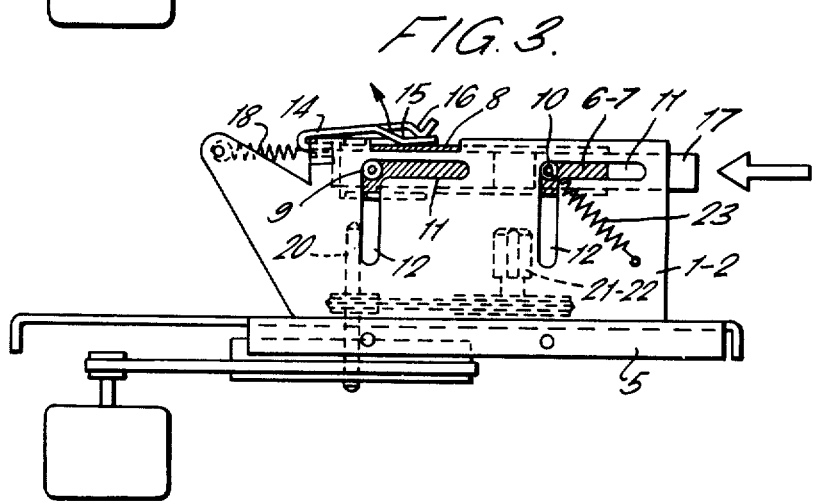

Referring to FIG. 4, the tape cartridge 17 and the movable housing may be released from the operative position and returned to the position of FIG. 3 and subsequently to the position of FIG. 2 with ejection of the tape cartridge, by means of a rod 26 actuated by a push-button 27. The rod 26 carries a pair of camming plates or projections 28 which are provided with inclined edges 29. Movement of the rod 26 in the direction of a tape cassette insertion will thus cause the projections 9 and 10 to be forced upwardly to the top of the portions 12 of the grooves in the frame lateral sides by the inclined edges 29 of projections 28. The movable housing 10, of course, will move toward the front edge of the device only after it has been fully displaced perpendicularly. The final movement in the plane of insertion will take place under the action of the springs 23.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. In apparatus for the recording and/or playback of information contained on a storage medium extending between feed and take-up reels in a cartridge, the cartridge having openings in at least one of its surfaces for receiving drive means for the reels, the improvement comprising:

a housing including a pair of opposed channel defining members, said channel defining members being spaced to slideably receive a storage medium containing cartridge within said housing, said housing and cartridge being movable bodily serially in two directions substantially perpendicular to each other to transport the received cartridge;

means for supporting said housing on the recording and/or playback apparatus; and means for guiding the movements of said housing in said two directions, said movements in a cartridge loading operation consisting of initial movement of said housing and cartridge bodily in a direction to bring the cartridge drive means receiving openings into alignment with drive means on the recording and/or playback apparatus, and subsequent movement of said housing and cartridge bodily in a second direction to cause the cartridge to be engaged with the drive means;

and said movements of said housing and cartridge bodily in a cartridge releasing operation being the reverse of said movements in a cartridge loading operation to disengage the cartridge from the drive means and to eject the cartridge.

2. The apparatus of claim 1 wherein said guiding means comprises:
   projections integral with said movable housing; and
   grooves in said supporting means, said projections engaging said grooves.

3. The apparatus of claim 2 further comprising:
   cam means mounted on said supporting means for engaging said projections, said cam means being movable to cause said projections and housing to move away from the playback apparatus to disengage the cartridge from the drive means; and
   means for resiliently biasing said housing into the cartridge-drive means engaging position, said resilient biasing means further urging said movable housing in a direction opposite to said initial direction of movement subsequent to disengagement of the cartridge from the drive means by said cam means.

4. The apparatus of claim 1 further comprising:
   cartridge responsive blocking means mounted on said support means, said blocking means limiting the motion of said housing in said initial direction only when a cartridge is not mounted thereon.

5. In apparatus for the recording and/or playback of information contained on a storage medium extending between feed and take-up reels in a cartridge, the cartridge having openings in at least one of its surfaces for receiving drive means for the reels, the improvement comprising:
   a housing, said housing slideably receiving a storage medium containing cartridge, said housing being movable to transport the received cartridge serially in two directions:
   means for supporting said housing on the recording and/or playback apparatus;
   means for guiding the movements of said housing in said two directions, said movements in a cartridge loading operation consisting of initial movement in a direction to bring the cartridge drive means receiving openings into vertical alignment with drive means on the recording and/or playback apparatus, the housing subsequently being guided in a second direction to cause the cartridge to be engaged with the drive means;
   a blocking member pivotally mounted on said supporting means;
   at least a first projection on said blocking member, said first projection normally engaging said housing and limiting movement thereof; and
   a camming projection on said blocking member, said camming projection being adapted to be contacted by a cartridge whereby said blocking member will be pivoted to disengage said first projection from said housing when a cartridge is present in said housing.

6. The apparatus of claim 5 wherein said guiding means comprise:
   projections integral with said movable housing; and
   grooves in said supporting means, said projections engaging said grooves.

7. The apparatus of claim 6 further comprising:
   cam means mounted on said supporting means for engaging said projections, said cam means being movable to cause said projections and housing to move away from said recording apparatus to disengage the cartridge from the drive means; and
   means for resiliently biasing said housing into the cartridge-drive means engaging position, said resilient biasing means further urging said movable housing in a direction opposite to said initial direction of movement subsequent to disengagement of the cartridge from the drive means by said cam means.

8. The apparatus of claim 7 wherein said camming projection on said blocking member is adapted to engage an indexing projection of a tape cartridge, the cartridge indexing projection being provided only on one edge of the cartridge.

9. The apparatus of claim 5 further comprising:
   means resiliently biasing said blocking member into the motion limiting position.

10. The apparatus of claim 8 further comprising:
    means resiliently biasing said blocking member into the motion limiting position.

11. In apparatus for the recording and/or playback of information contained on a storage medium extending between feed and take-up reels in a cartridge, the cartridge having openings in at least one of its surfaces for receiving drive means for the reels, the improvement comprising:
    a housing, said housing slideably receiving a storage medium containing cartridge, said housing being movable to transport the received cartridge serially in two directions;
    means for supporting said housing on the recording and/or playback apparatus;
    means for guiding the movements of said housing in said two directions, said movements in a cartridge loading operation consisting of initial movement in a direction to bring the cartridge drive means receiving openings into vertical alignment with drive means on the recording and/or playback apparatus, the housing subsequently being guided in a second direction to cause the cartridge to be engaged with the drive means;
    a blocking member pivotally mounted on said supporting means;
    at least a first projection on said blocking member, said first projection normally engaging said housing and limiting movement thereof; and
    a camming projection on said blocking member, said camming projection being adapted to be contacted by a cartridge whereby said blocking member will be pivoted to disengage said first projection from said housing when a cartridge is present in said housing.

* * * * *